United States Patent
Chen et al.

(10) Patent No.: US 11,453,012 B2
(45) Date of Patent: Sep. 27, 2022

(54) SALT LAMP HUMIDIFIER

(71) Applicant: XIAMEN AIRPPLE ELECTRONIC INDUSTRY CO., LTD., Xiamen (CN)

(72) Inventors: Jueyuan Chen, Xiamen (CN); Yunlong Gao, Xiamen (CN); Weiqiang Zheng, Xiamen (CN)

(73) Assignee: XIAMEN AIRPPLE ELECTRONIC INDUSTRY CO., LTD., Fujian (CN)

( * ) Notice: Subject to any disclaimer, the term of this patent is extended or adjusted under 35 U.S.C. 154(b) by 330 days.

(21) Appl. No.: 16/732,901

(22) Filed: Jan. 2, 2020

(65) Prior Publication Data

US 2021/0060577 A1 Mar. 4, 2021

(30) Foreign Application Priority Data

Aug. 27, 2019 (CN) .......................... 201910794811.6

(51) Int. Cl.
| | | |
|---|---|---|
| *B03C 3/16* | (2006.01) | |
| *B03C 3/68* | (2006.01) | |
| *F21V 33/00* | (2006.01) | |
| *F24F 6/12* | (2006.01) | |

(52) U.S. Cl.
CPC .................. *B03C 3/16* (2013.01); *B03C 3/68* (2013.01); *F21V 33/0004* (2013.01); *F24F 6/12* (2013.01)

(58) Field of Classification Search
CPC ......... B03C 3/16; B03C 3/68; F21V 33/0004; F24F 6/12; F24F 2221/02; F24F 8/30; F21S 6/00
See application file for complete search history.

(56) References Cited

U.S. PATENT DOCUMENTS

| | | | | |
|---|---|---|---|---|
| 2005/0030747 | A1* | 2/2005 | Bogdal | A61L 9/03 362/253 |
| 2009/0180114 | A1* | 7/2009 | Fujii | G01N 21/718 356/318 |
| 2012/0018526 | A1* | 1/2012 | Tiba | A61K 9/0078 239/4 |
| 2016/0067369 | A1* | 3/2016 | Muhammad | A61L 9/22 422/109 |
| 2018/0214593 | A1* | 8/2018 | Breen | F21V 33/0064 |
| 2020/0046868 | A1* | 2/2020 | Meng | A61L 9/14 |
| 2020/0408425 | A1* | 12/2020 | Zchori | F24F 5/0035 |

FOREIGN PATENT DOCUMENTS

KR 20060067931 * 6/2006

OTHER PUBLICATIONS

EPO translation of KR20060067931 (Year: 2006).*

* cited by examiner

*Primary Examiner* — Stephen Hobson
(74) *Attorney, Agent, or Firm* — Muncy, Geissler, Olds & Lowe, P.C.

(57) ABSTRACT

A salt lamp humidifier which has a humidifier base body and a humidifier water tank connected with the humidifier base body to form an air humidifier, and a salt lamp chamber is arranged on the humidifier base body, in which a salt lamp is provided, the salt lamp and the humidifier base body are configured as a retractable structure. The salt lamp is arranged in the humidifier base body or the salt lamp is assembled on the bottom cover to form a retractable concealed structure with reasonable design. The salt lamp salt stone box has a retractable design to facilitate the replacement of salt stones.

10 Claims, 7 Drawing Sheets

SALT LAMP HUMIDIFIER

TECHNICAL FIELD

The present disclosure relates to a salt lamp humidifier, which belongs to the technical field of salt lamp humidifier manufacturing according to the International Patent Classification (IPC).

BACKGROUND

With the economic development and the improvement of people's living standards, people's requirements for quality of life and health are getting higher and higher. Air humidifiers have entered many households around the world and have become an indispensable small household appliance for households in dry areas to increase the relative humidity in a certain space. Commonly used air humidifiers include ultrasonic humidifiers, purification humidifiers, electric heating humidifiers, immersed electrode humidifiers, cold fog humidifiers, etc., among which ultrasonic humidifiers use ultrasonic high-frequency vibration to atomize water into micro particles, so as to achieve uniform humidification, fresh air, improvement of health, removal of the heat from winter heating, and create a comfortable living environment. In order to meet people's needs for their use functions and aesthetic functions, the types of air humidifiers are more refined and the shapes are richer.

The salt lamp utilizes salt ore. Under the illumination of light, it can release negative ions. The released negative ions can effectively purify the air, but when the air humidity is relatively high, such as when the humidity exceeds 70%, the salt ore will deliquesce. A certain incense machine adds crystal salt ore on the basis of incense, but due to the structural limitation, the smoked water vapor is blown around the crystal salt ore, which makes the crystal salt mine easy to deliquesce.

The inventors of the present application have studied the air humidifier for many years. The existing humidifier generally only has the effect of air humidification, and has not been combined with a salt lamp. In order to increase the diversification of the function of the humidifier, this solution is proposed.

SUMMARY

In view of the shortcomings of the prior art, the present application aims to provide a salt lamp humidifier. The integrated design of the salt lamp and the humidifier adds the function of the salt lamp on the basis of humidifying air.

For this purpose, the detailed technical solution adopted by the application is as follows:

a salt lamp humidifier, comprising: a humidifier base body and a humidifier water tank which is connected with the humidifier base body to form an air humidifier, and a salt lamp chamber is arranged on the humidifier base body, in which a salt lamp is provided, wherein the salt lamp and the humidifier base body are configured as a retractable structure.

Further, the humidifier base body and the humidifier water tank are connected to form an ultrasonic humidifier, in which the humidifier base body is provided with an atomization chamber, and an ultrasonic atomization piece is arranged in the atomization chamber, the salt lamp chamber is located under the atomization chamber.

Further, the salt lamp chamber of the humidifier base body is provided with an side opening, the salt lamp comprises a salt stone box, the salt stone box is provided with salt stone, the side opening of the salt lamp chamber is the inlet and outlet of the salt stone box, and the salt stone box is movable to be pushed into or pulled out of the salt lamp chamber.

Further, the salt lamp comprises a light source fixed on a side wall of the salt lamp chamber; when the salt stone box is placed in the salt lamp chamber, the light source illuminates the salt stone in the salt stone box to form a negative ion generator and an ambient lamp.

Further, a bottom surface of the salt lamp chamber of the humidifier base body is provided with at least one guide rail on which a limit step is provided; a matching guide groove is provided on a bottom surface of the salt stone box, the salt stone box is pulled and limited by the guide rail, and a spice box is provided therein, a light source insertion slot is arranged on a side of the salt stone box.

Further, the air humidifier has a mist discharging pipe, and a side of the mist discharging pipe is connected to an air duct, the air duct passes through the atomization chamber of the humidifier base body and extends to the salt lamp chamber, so that the negative ions released by the salt lamp are mixed with water mist particles to be discharged from the mist discharging pipe to humidify and purify the air.

Further, the center of the humidifier water tank is provided with a mist discharging pipe, a water tank cavity in the peripheral side of the mist discharging pipe is filled with water for replenishing the atomization chamber, and the mist discharging pipe is connected to the air duct near a bottom end side, and the air duct extends into the salt lamp chamber of the humidifier base body, and the side opening of the salt lamp chamber forms an air duct inlet.

Further, a guiding air duct is arranged on a mating surface of the humidifier water tank and the humidifier base body, one end of the guiding air duct is connected with the mist discharging pipe, and the other end is matched with a base air duct disposed in the humidifier base body, wherein an air inlet of the base air duct is communicated with the salt lamp chamber, an air outlet of the base air duct is higher than the highest water level of the atomization chamber of the humidifier base body, and the salt lamp chamber, the base air duct and the guiding air duct are sequentially connected to form the air duct.

Further, an anti-fog column is connected to the bottom of the mist discharging pipe of the humidifier water tank, and is arranged above an atomization area of the atomization chamber of the humidifier base body, the atomized water mist is sprayed into the anti-fog column and enters the mist discharging pipe, a part of the anti-fog column protrudes from the bottom end surface of the humidifier water tank, and a side opening of the part of the anti-fog column is connected with the guiding air duct.

Further, the atomization chamber of the humidifier base body is provided with a water level column and a minimum water level detecting boss, one side of the atomization chamber is a control room which is located above the salt lamp chamber, and a humidifier circuit board is arranged in the control room.

The present application extends the functions of the humidifier and the salt lamp through the integrated design of the salt lamp and the humidifier, and has the following beneficial effects:

1. in the present invention, the salt lamp is arranged in the humidifier base body or the salt lamp is assembled on the bottom cover to form a retractable concealed structure, which reduces the occurrence of deliquesce, and has a reasonable structure and clever design.

2. the negative ions released by the salt lamp of the present application are mixed with the atomized particles and discharged through the air duct of the humidifier, so that the negative ions and the water mist particles work together to adsorb the dust or particles in the air and improve the air.

3. the retractable design of the salt stone box of the salt lamp of the present application is convenient for replacing the salt stone, and the cooperation between the guide rail and the guide groove enables a stable drawing.

DETAILED DESCRIPTION

The present disclosure will be further described in conjunction with the drawings and specific embodiments.

An Embodiment

As shown in FIGS. 1-7, a salt lamp humidifier integrated with a humidifier and a salt lamp, comprising: a humidifier base body 1 and a humidifier water tank 2 which is connected with the humidifier base body 1 to form an air humidifier, and a salt lamp chamber 11 is arranged on the humidifier base body 1, in which a salt lamp 3 is provided, wherein the salt lamp 3 and the humidifier base body 1 are configured as a retractable structure, i.e., a retractable concealed structure. The humidifier base body 1 and the humidifier water tank 2 are connected to form an ultrasonic humidifier, in which the humidifier base body 1 is provided with a atomization chamber 12, the humidifier water tank 2 is closed at an opening of the atomization chamber 12, an ultrasonic atomization piece 4 is arranged in the atomization chamber 12 and electrically connected with a humidifier circuit board, and the salt lamp chamber 11 is located under the atomization chamber 12. The salt lamp chamber 11 of the humidifier base body 1 is provided with a side opening, the salt lamp 3 comprises a salt stone box 31, the salt stone box 31 is provided with salt stone, the side opening of the salt lamp chamber is the inlet and outlet of the salt stone box, and the salt stone box is movable to be pushed or pulled out of the salt lamp chamber. The salt lamp 3 comprises a light source 32 disposed in the salt stone box or directly fixed on a side wall of the salt lamp chamber 11; when the salt stone box 31 is placed in the salt lamp chamber 11, the light source 32 illuminates the salt stone in the salt stone box 31 to form a negative ion generator and an ambient lamp. In general, the light source 32 is a halogen lamp, and other lamps with the same function may also be used. There is a gap between the top of the salt stone box and the upper wall of the salt lamp chamber as an air inlet.

Figure 1:
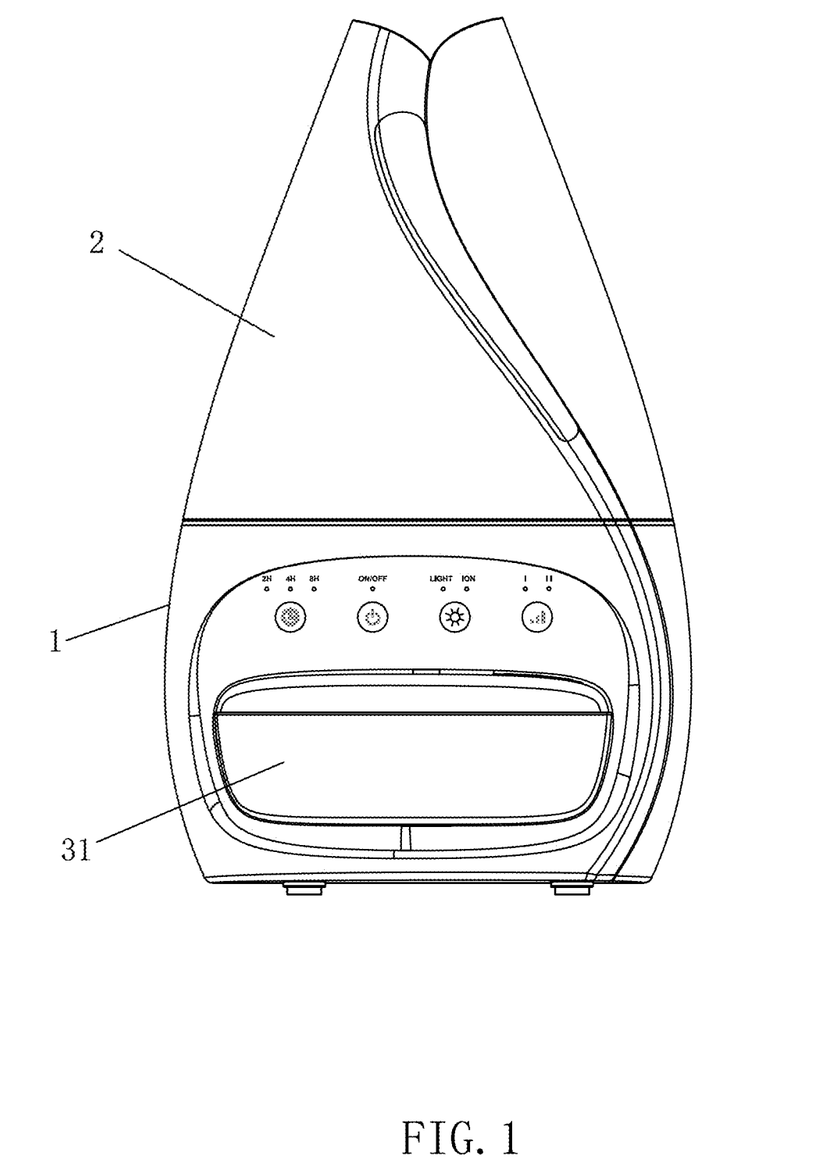
FIG. 1 is a front view of a salt lamp humidifier according to an embodiment of the present disclosure.
Figure 2:
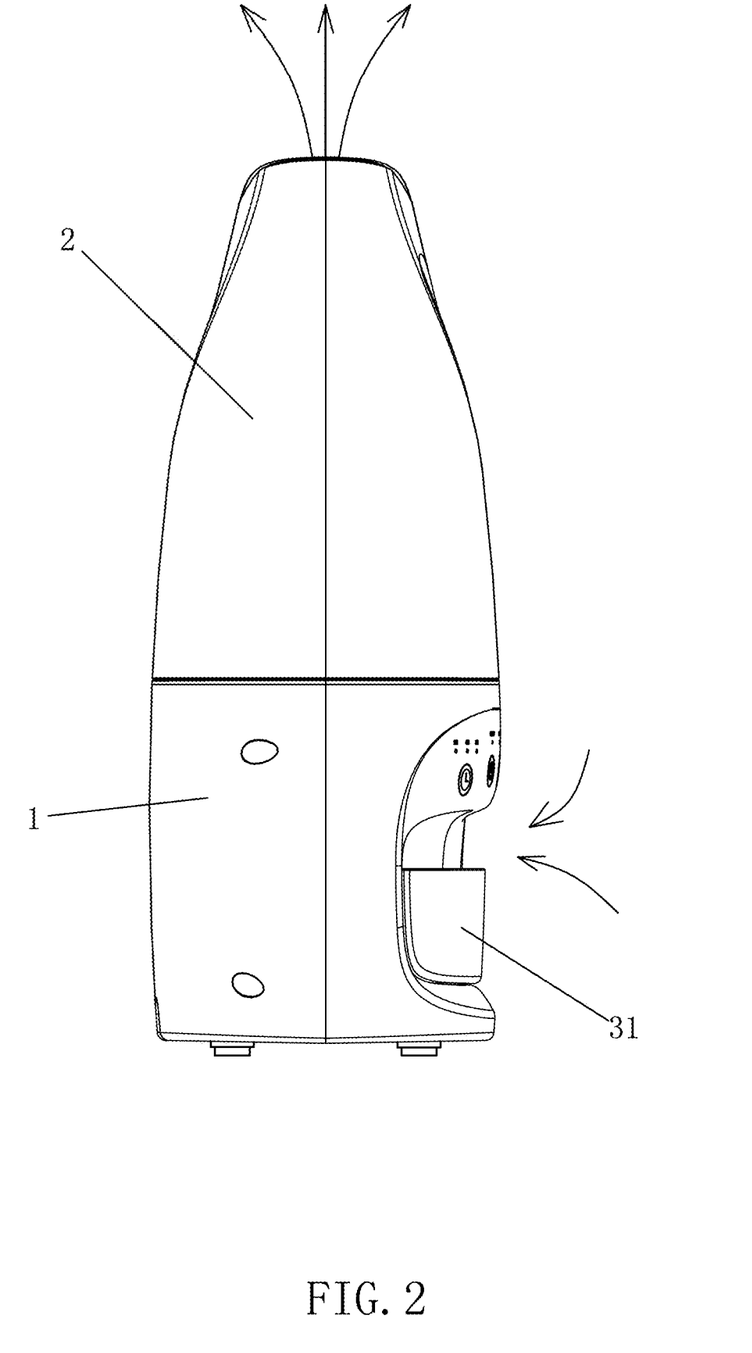
FIG. 2 is a side view of a salt lamp humidifier according to an embodiment of the present disclosure.
Figure 3:
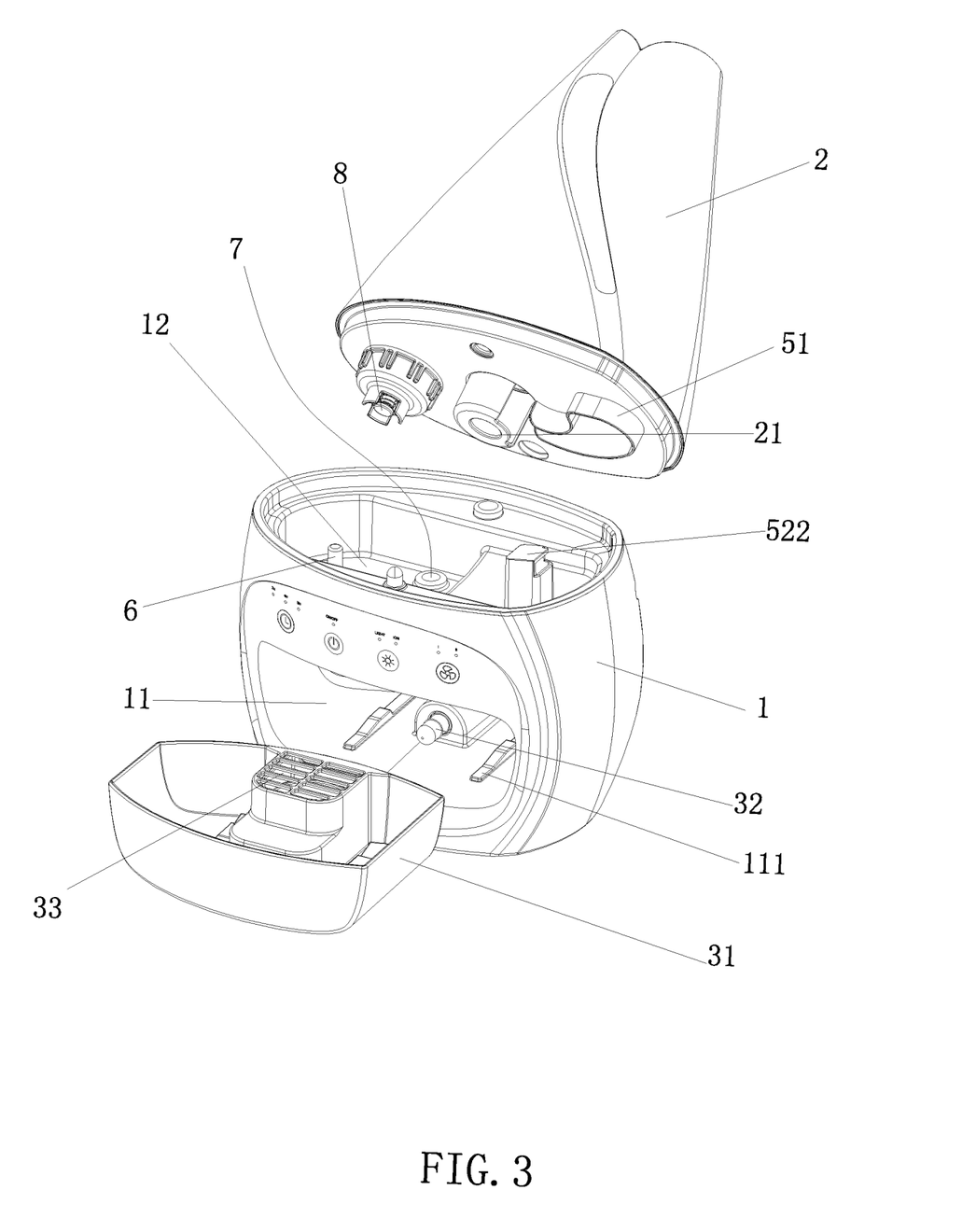
FIG. 3 is an exploded schematic view of a salt lamp humidifier according to an embodiment of the present disclosure.
Figure 4:
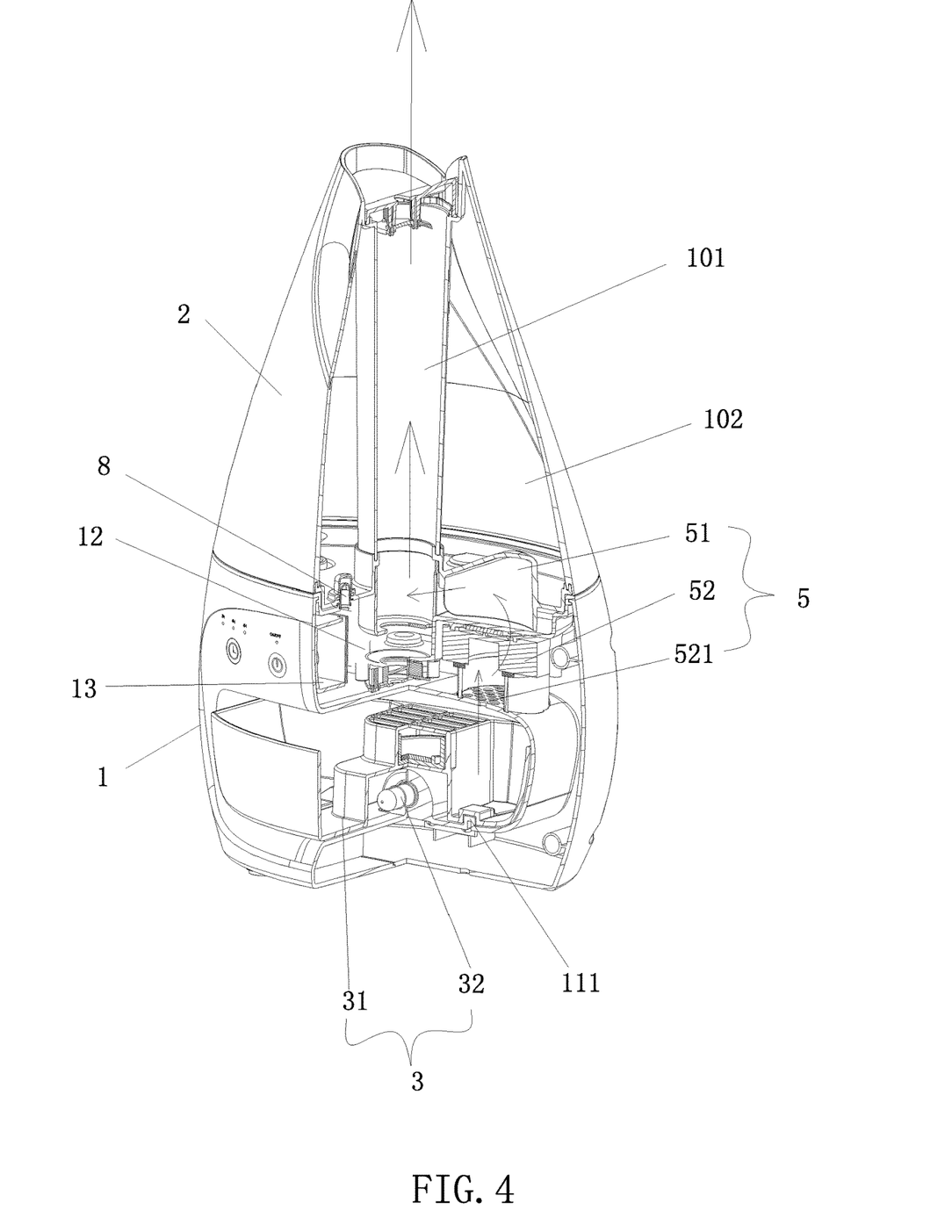
FIG. 4 is a stepped sectional view of a salt lamp humidifier according to an embodiment of the present disclosure.
Figure 5:
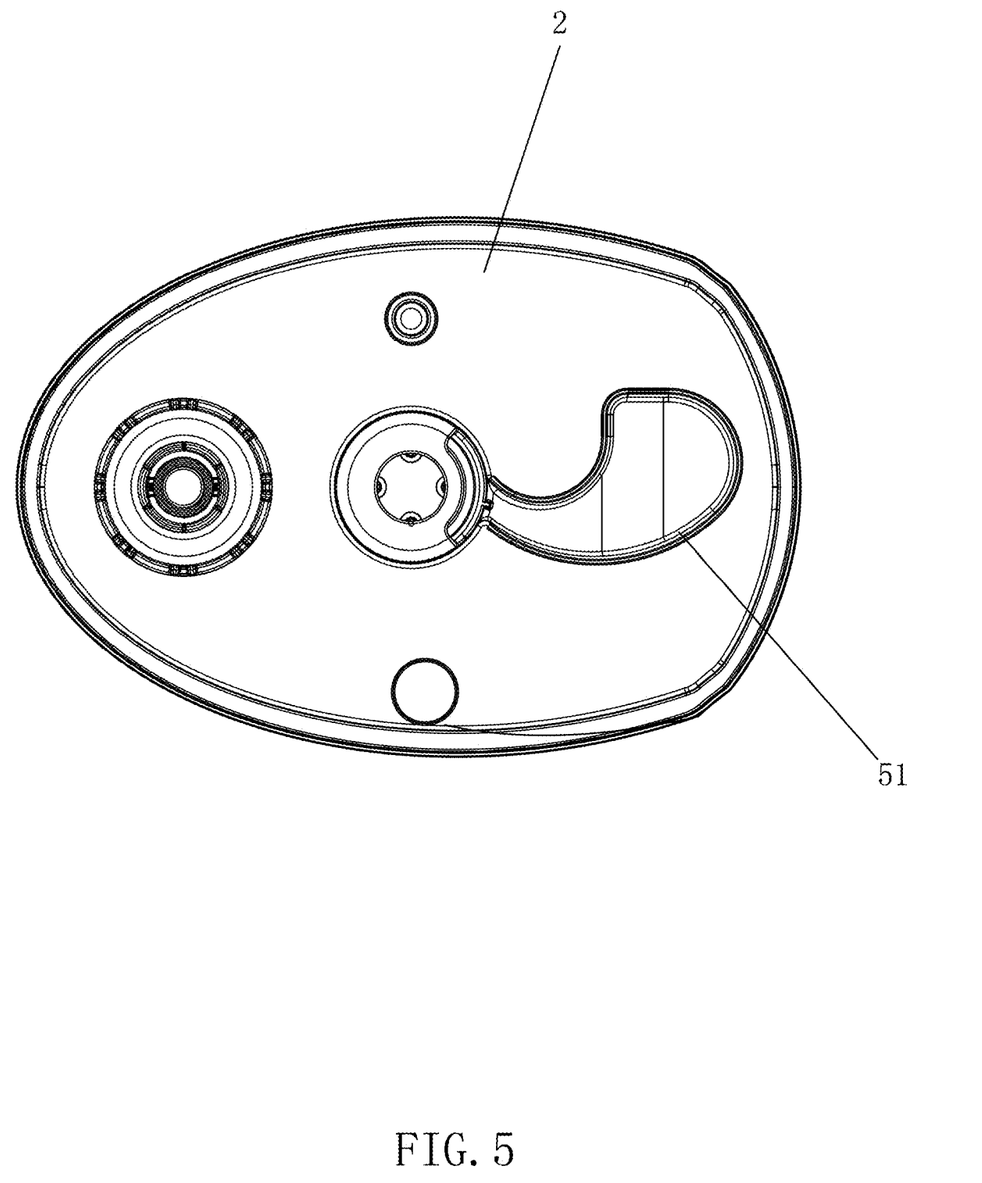
FIG. 5 is a bottom view of a humidifier water tank of a salt lamp humidifier according to an embodiment of the present disclosure.
Figure 6:
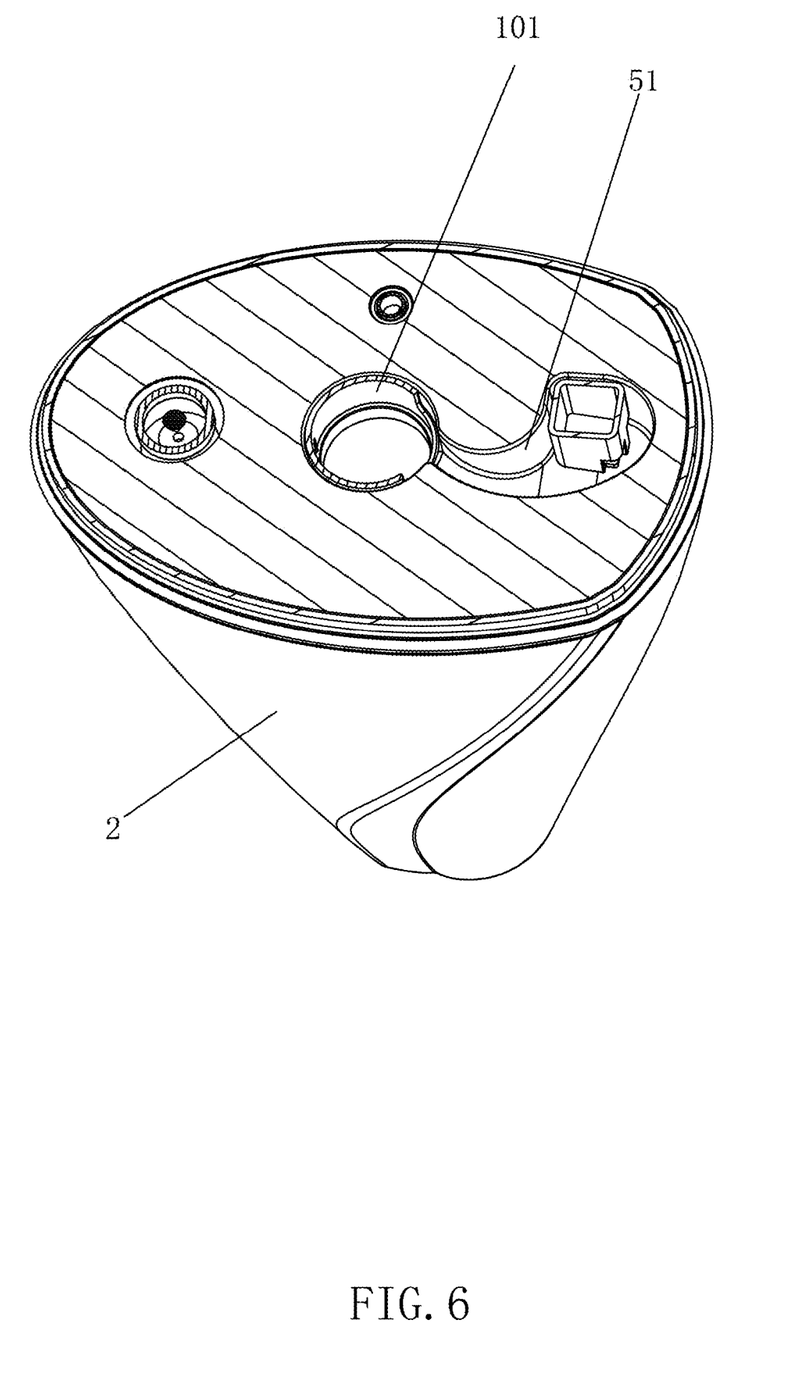
FIG. 6 is a sectional view of an air duct of a humidifier water tank according to an embodiment of the present disclosure.
Figure 7:
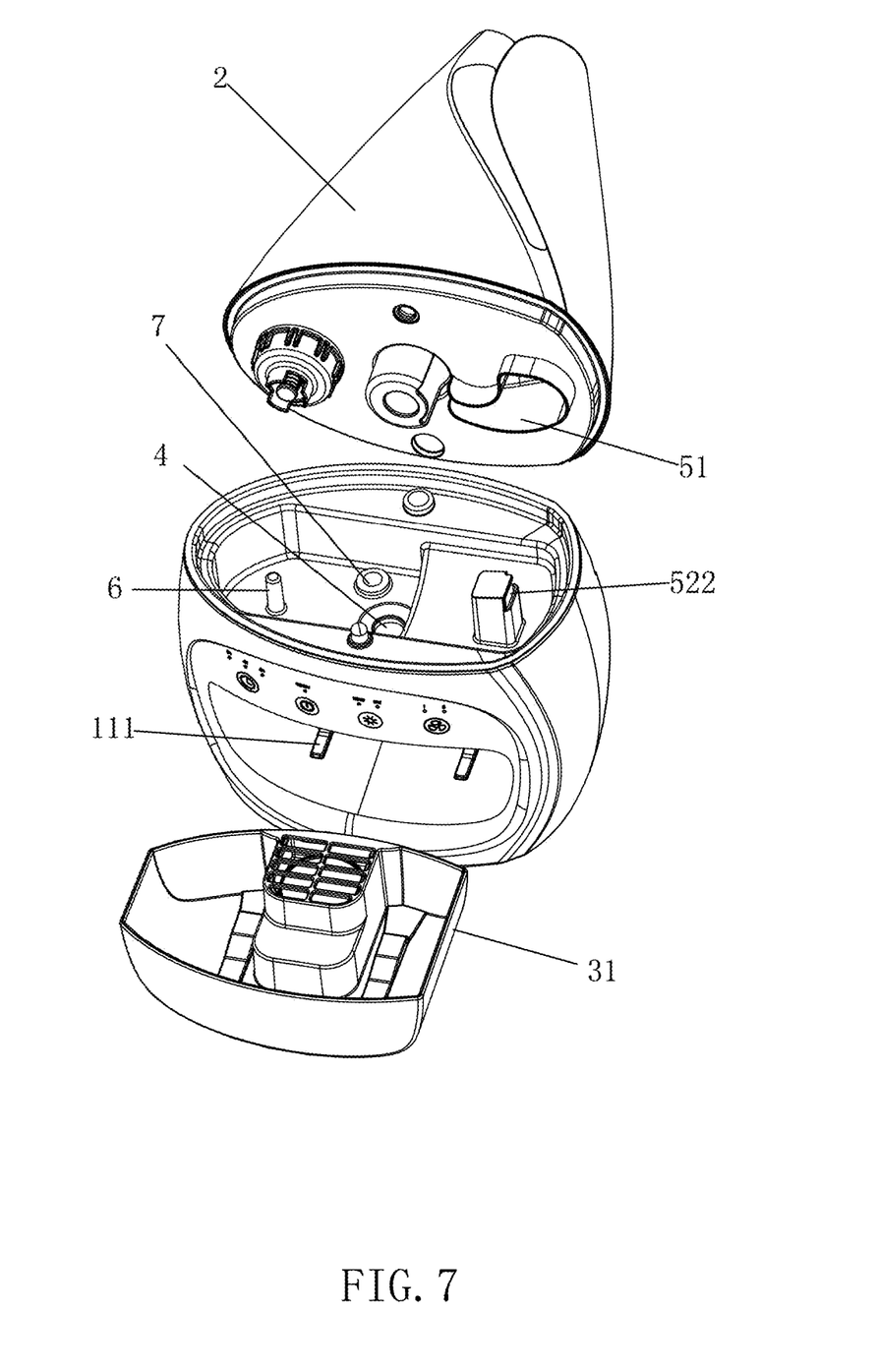
FIG. 7 is another exploded view of a salt lamp humidifier according to an embodiment of the present disclosure.

As shown in FIGS. 3, 4 and 7, a bottom surface of the salt lamp chamber of the humidifier base body 1 is provided with at least one guide rail 111 (for example, two guide rails in the embodiment) on which a limit step is provided; a guide groove is provided on a bottom surface of the salt stone box 31, the salt stone box 31 can be pulled and limited by the guide rail, and a spice box 33 is provided therein, a light source insertion slot is also arranged on a side of the salt stone box 31. The air humidifier has a mist discharging pipe 101 including a mist discharging opening, and a side of the mist discharging pipe 101 is connected to an air duct 5, the air duct 5 passes through the atomization chamber of the humidifier base body 1 and extends to the salt lamp chamber, so that the negative ions released by the salt lamp are mixed with water mist particles to be discharged from the mist discharging opening of the mist discharging pipe 101 to humidify and purify the air. Specifically, the center of the humidifier water tank 2 is provided with a mist discharging pipe 101, a water tank cavity 102 in the peripheral side of the mist discharging pipe 101 is filled with water for replenishing the atomization chamber, and the mist discharging pipe is connected to the air duct 5 near a bottom end side, the air duct extends into the salt lamp chamber 11 of the humidifier base body, and the side opening of the salt lamp chamber 11 forms an air duct inlet, as shown in FIG. 2. A guiding air duct 51 is arranged on a mating surface of the humidifier water tank 2 and the humidifier base body 1, one end of the guiding air duct 51 is connected with the mist discharging pipe 101, and the other end is matched with a base air duct disposed in the humidifier base body 1, a fan 52 is installed in the base air duct, wherein an air inlet 521 of the base air duct is communicated with the salt lamp chamber, an air outlet 522 of the base air duct is higher than the highest water level of the atomization chamber of the humidifier base body, and the salt lamp chamber 11, the base air duct and the guiding air duct 51 are sequentially connected to form the air duct.

As shown in FIGS. 3 and 4, an anti-fog column 21 is connected to the bottom of the mist discharging pipe of the humidifier water tank 2, and is arranged above an atomization area of the atomization chamber of the humidifier base body, the atomized water mist is sprayed into the anti-fog column and enters the mist discharging pipe, a part of the anti-fog column 21 protrudes from the bottom end surface of the humidifier water tank, and a side opening of the protruding portion of the anti-fog column 21 is connected with the guiding air duct 51.

As shown in FIGS. 4 and 7, the atomization chamber 12 of the humidifier base body is provided with a water level column 6 and a minimum water level detecting boss 7, one side of the atomization chamber 12 is a control room 13 which is located above the salt lamp chamber 11, and the humidifier circuit board is arranged in the control room, the light source 32 of the salt lamp is electrically connected to another atomizing circuit board in the present invention. The control room is connected with a plurality of keys, each of which is located on the upper side of the opening of the salt lamp chamber 11, the control room 13 is provided with a night light, and the night light is electrically connected to the humidifier circuit board.

The side of the humidifier base body 1 and the humidifier water tank 2 are provided with transparent windows. The transparent windows are beautifully designed in an arc shape. A part of the transparent windows in the humidifier water tank 2 can identify the water level in the water tank to facilitate water addition when water is scarce.

The cooperation of the humidifier water tank 2 and the humidifier base body 1 of the present application forms a top fill humidifier, that is, the water tank is on the upper side and the atomizing area is on the lower side. The atomized water mist is discharged outward through the mist discharging pipe of the water tank design. The mating surface of the humidifier water tank 2 and the humidifier base body 1 is provided with a water inlet, and a water cover 8 is provided at the water inlet. The humidifier base body 1 may also be referred to as a bottom cover.

Differences between the salt lamp humidifier of the present application and other ultrasonic humidifiers:

(1) adding a salt stone box 31 that can store salt stones, placing and limiting it on the humidifier base body (i.e., the bottom cover) by the guide rail 111 to make it difficult to fall out when tilted;

(2) during use, the light emitted by the halogen lamp on the humidifier base body (i.e., the bottom cover) 1 illuminates on the salt stone in the salt stone box to play the role of an atmosphere lamp;

(3) the heat of the halogen lamp will cause the salt stone to emit negative ions, which can be used as a natural negative ion generator.

The salt stone used in the salt lamp of the present application is a Himalayan pure natural crystal salt ore. The salt stone releases negative ions that are beneficial to the human body and emit the unique light of the salt stone at the same time. Through the unique translucent crystal structure of the salt stone, it emits tangerine, light yellow, or pink white natural light, soft and pleasing to the eyes.

Therefore, the beneficial effects of the present disclosure lie in:

1. the salt lamp releases negative ions, which purifies the air and reduces the electromagnetic wave pollution to the work environment; at the same time, the salt lamp humidifier can also minimize the radiation generated by appliances or screens, and can be placed next to frequently used electromagnetic products, such as, microwave oven, computer;

2. for the allergic patients, the salt lamp humidifiers can help reduce allergens, kill bacteria, and improve the quality of the surrounding air and maintain the balance of the ionic environment;

3. the salt lamp humidifier emits unique light and creates a naturally balanced ionic environment, so that the air can keep fresh and circulating, eliminate bacterial dust, clean the air, help stabilize mood and improve sleep quality.

The above are detailed descriptions of the preferred embodiments of the present disclosure, but the present disclosure is not limited to the embodiments, various equivalent deformations or substitutions can be made by those skilled in the art without departing from the nature of the present disclosure, and these equivalent deformations or substitutions are all included in the scope defined by the claims of the present application.

The invention claimed is:

1. A salt lamp humidifier, comprising: a humidifier base body and a humidifier water tank connected with the humidifier base body to form an air humidifier, and a salt lamp chamber arranged on the humidifier base body, in which a salt lamp is provided, wherein the salt lamp and the humidifier base body are configured as a retractable structure; and wherein, the salt lamp chamber of the humidifier base body is provided with a side opening, the salt lamp comprises a salt stone box, the salt stone box is provided with salt stone, the side opening of the salt lamp chamber is configured as an inlet/outlet of the salt stone box, and the salt stone box is movable to be pushed or pulled out of the salt lamp chamber.

2. The salt lamp humidifier according to claim 1, wherein, the humidifier base body and the humidifier water tank are connected to form an ultrasonic humidifier, in which the humidifier base body is provided with an atomization chamber, and an ultrasonic atomization piece is arranged in the atomization chamber, the salt lamp chamber is located under the atomization chamber.

3. The salt lamp humidifier according to claim 2, wherein, the air humidifier has a mist discharging pipe, and a side of the mist discharging pipe is connected to an air duct, the air duct passes through the atomization chamber of the humidifier base body and extends to the salt lamp chamber, so that negative ions released by the salt lamp are mixed with water mist particles to be discharged from the mist discharging pipe to humidify and purify air.

4. The salt lamp humidifier according to claim 3, wherein, the center of the humidifier water tank is provided with the mist discharging pipe, a water tank cavity in the peripheral side of the mist discharging pipe is filled with water for replenishing the atomization chamber, and the mist discharging pipe is connected to the air duct near a bottom end side, and the air duct extends into the salt lamp of the humidifier base body, and the side opening of the salt lamp chamber forms an air duct inlet.

5. The salt lamp humidifier according to claim 3, wherein, a guiding air duct is arranged on a mating surface of the humidifier water tank and the humidifier base body, one end of the guiding air duct is connected with the mist discharging pipe, and an other end is matched with a base air duct disposed in the humidifier base body, wherein an air inlet of the base air duct is communicated with the salt lamp chamber, an air outlet of the base air duct is higher than the highest water level of the atomization chamber of the humidifier base body, and the salt lamp chamber, the base air duct and the guiding air duct are sequentially connected to form the air duct.

6. The salt lamp humidifier according to claim 5, wherein, an anti-fog column is connected to a bottom of the mist discharging pipe of the humidifier water tank, and is arranged above an atomization area of the atomization chamber of the humidifier base body, an atomized water mist is sprayed into the anti-fog column and enters the mist discharging pipe, a part of the anti-fog column protrudes from a bottom end surface of the humidifier water tank, and a side opening of the protruding portion of the anti-fog column is connected with-the guiding air duct.

7. The salt lamp humidifier according to claim 3, wherein, the atomization chamber of the humidifier base body is provided with a water level column and a minimum water level detecting boss, one side of the atomization chamber is a control room which is located above the salt lamp chamber, and a humidifier circuit board is arranged in the control room.

8. The salt lamp humidifier according to claim 2, wherein, the atomization chamber of the humidifier base body is provided with a water level column and a minimum water level detecting boss, one side of the atomization chamber is a control room which is located above the salt lamp chamber, and a humidifier circuit board is arranged in the control room.

9. The salt lamp humidifier according to claim 1, wherein, the salt lamp comprises a light source fixed on a side wall of the salt lamp chamber; when the salt stone box is placed in the salt lamp chamber, the light source illuminates the salt stone in the salt stone box to form a negative ion generator and an ambient lamp.

10. The salt lamp humidifier according to claim 1, wherein, a bottom surface of the salt lamp chamber of the humidifier base body is provided with at least one guide rail on which a limit step is provided; a matching guide groove is provided on a bottom surface of the salt stone box, the salt stone box can be pulled and limited by the guide rail, and a spice box is provided therein, a light source insertion slot is arranged on a side of the salt stone box.

\* \* \* \* \*